Dec. 7, 1937.   F. J. LEMIEUX   2,101,317
CLAMPING DEVICE
Filed Aug. 12, 1935

Inventor
Felix Joseph Lemieux.
By John J. McLaughlin Atty.

Patented Dec. 7, 1937

2,101,317

UNITED STATES PATENT OFFICE 2,101,317

CLAMPING DEVICE

Felix Joseph Lemieux, Chicago, Ill., assignor of twenty-five per cent to John J. McLaughlin, twelve and one-half per cent to Emma Lemieux and twelve and one-half per cent to Mary Tonjum, all of Chicago, Ill.

Application August 12, 1935, Serial No. 35,777

16 Claims. (Cl. 189—36)

My invention relates to clamping devices and is particularly concerned with such devices for use in the erection of scaffolding, rigs, derrick hoists, and the like.

In general my clamping device comprises a pair of clamping members which are arranged in back-to-back relation along a wall thereof, each of the clamping devices comprising a pair of jaws which are integral with the walls which are placed in back-to-back relation and at right angles to said walls. One of said jaws of each of the clamping members is provided with an overhanging lip for a purpose which will later be described. The exterior surfaces of said jaws are preferably provided with bosses which are threadedly apertured so that a suitable rod or other member of any desired shape may be clamped or locked in place through the medium of a clamping screw which passes through one of the threaded apertures and frictionally engages the rod or member to be clamped or locked in position. The clamping members may be disposed in rigid relation to each other or one may be swiveled upon the other to permit the support of suitable elements in any desired angular relation to each other.

Clamping devices of the general nature of my invention have heretofore been proposed but they possess certain disadvantages, particularly with regard to the versatility of their usage. For example, the patent to Price, No. 1,486,158 discloses a clamping device which bears a superficial resemblance to that of my invention. This device, however, does not possess the versatility of being used in various environments and for clamping differently shaped members to the extent that is the situation with respect to the clamp of my invention. Particularly is this true in connection with the utilization of the clamp in connection with ordinary building materials. Specifically, my clamping device possesses marked utility in connection with I-beams and the like, whereas the clamping device of the Price patent cannot be successfully used in such a set-up. In the Garrett patent, No. 1,963,981 there is disclosed a clamp which, although satisfactory for certain purposes, is deficient in the same general particulars as described above in connection with the Price patent.

It is accordingly an object of my invention to provide a clamping device which will have a wide range of utility for clamping members of varying shapes.

It is a further object of my invention to provide a clamp which is simple in structure, inexpensive to produce and which will withstand the rigors of hard usage. A still further object of my invention is the provision of a clamp which will have marked utility in the erection of scaffolding, rigs, derrick hoists, frame-works, and other supporting structures.

With the foregoing objects in view and others which will become more apparent as the description of the invention proceeds, I shall now describe my invention more particularly in conjunction with the drawing wherein.

Figure 1:
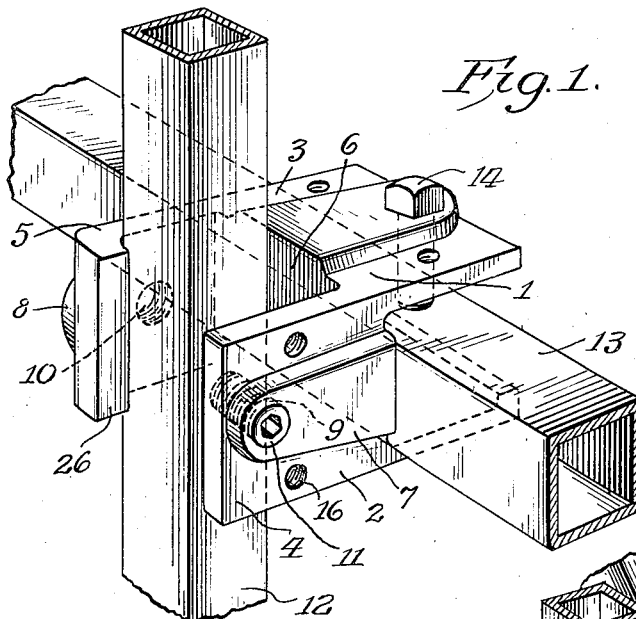
Figure 1 is a perspective view of one embodiment of my clamp showing two members held in clamping position therein.

As shown in Figure 1, my clamp embodies a body portion 1 consisting of two clamping members 2 and 3. The clamping member 2 comprises two jaw members 4 and 5, the jaw member 5 being provided with an overhanging lip 26. Spanning or joining the jaws 4 and 5 is a wall 6 which is at right angles to said jaws and is preferably integral therewith. On the exterior surface of each of the jaws there are formed, also preferably integral with said jaws, bosses 7 and 8 through which threaded apertures 9 and 10 pass, the threaded apertures also passing entirely through the jaws. A threaded clamping screw 11 is adapted to fit into the threaded apertures 9 and 10 to lock a member of any desired shape in place. In Figure 1 a member 12 having a substantially square cross section is shown locked in position. The wall 6 is common to both clamping members 2 and 3. The construction of the clamping member 3 is identical with that of clamping member 2 and need not further be described. Within the socket of the clamping member 3 is shown a member 13, which is substantially square in cross section, held in place by means of the clamping bolt 14. The jaw member 2 is provided with threaded apertures 15 and 16 which are disposed in closer proximity than the threaded apertures 9 to the wall 6 and serve to receive threaded clamping screws. By this arrangement, the versatility of the clamp is increased in that members relatively small in cross section may be firmly engaged and held in place.

Figure 3:
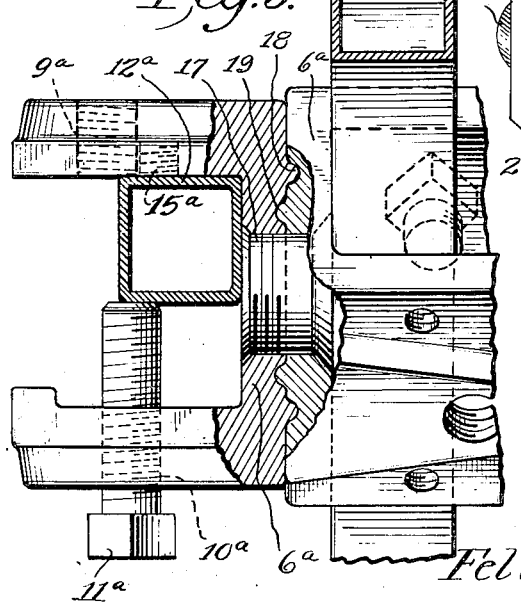
Figure 3 is an elevational view of Figure 2 with a portion thereof showing the means for connecting the two clamping members in section.
Figure 2:
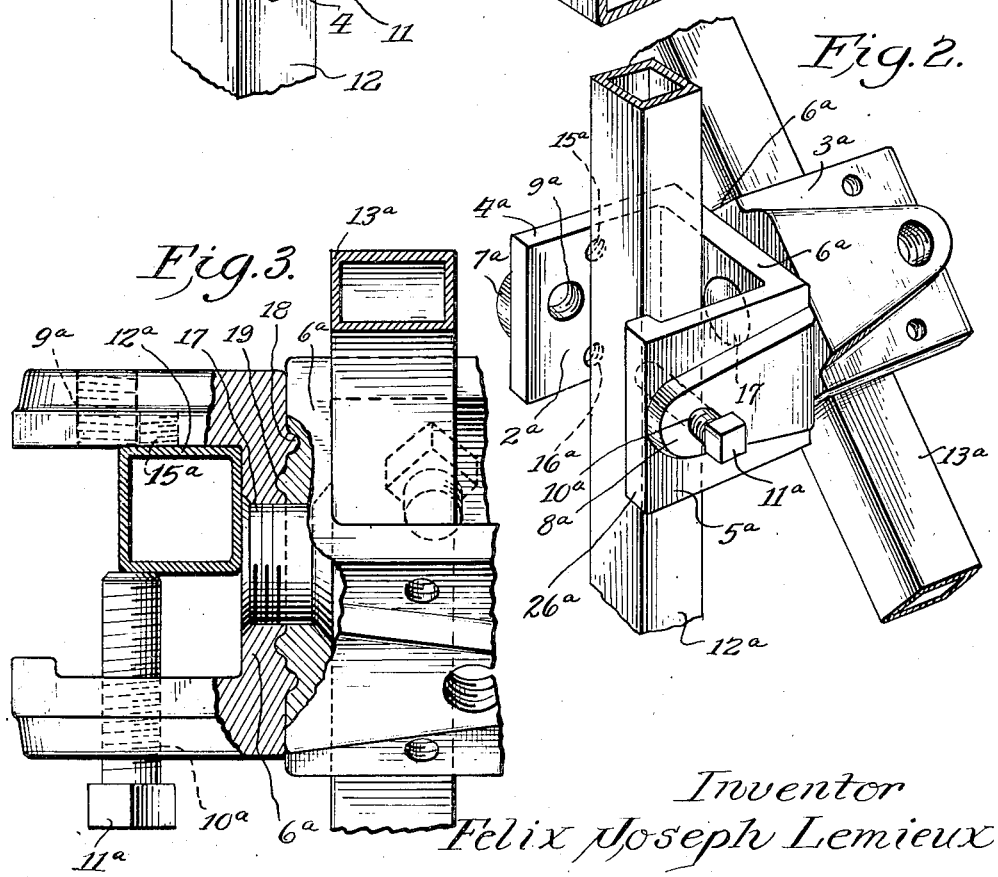
Figure 2 is a perspective view of another embodiment of my invention in which the clamping members are shown in angular displacement.

In Figures 2 and 3 I show an embodiment of my invention in which the clamping members are swiveled upon each other so that they may be placed in any desired angular relation to each other. Since, aside from the swiveling feature, the clamp is substantially the same as described in Figure 1, I shall not refer to the particular structural details other than with relation to the swiveling feature. The corresponding elements in Figures 1 and 2 are similarly numbered with the exception that those in Figure 2 are provided with a suffix "a".

In the device shown in Figures 2 and 3, the jaw members 4a and 5a and the corresponding jaw members of the clamping member 3a are connected or spanned by separate or individual wall portions 6a. The wall portions 6a are in contiguous relation to each other and are held together by means of a connecting bolt 17 which is preferably countersunk in the wall portions 6a to provide a substantially flush surface on the inner surface of the wall portions 6a, as clearly shown in Figure 3. As shown in Figure 3, the connecting bolt 17 is provided with a thread and is firmly locked together with one of the wall portions 6a so that there is no relative movement therebetween. The other end of the connecting bolt 17 is smooth and the connection therewith and the wall portion 6a of the clamping member 3a is such as to provide a relative movement therebetween. As is clearly shown in Figure 3 the exterior surfaces of the wall portions 6a are provided with annular lugs 18 and 19, there being a corresponding annular recess in the wall portion adjacent said lugs and into which said lugs fit. This structure acts as a guide means and fixes definitely the course of the clamping members when they are rotated or swiveled upon each other. Furthermore, this structure serves to strengthen the clamp and decreases shearing forces upon the connecting bolt 17. It will be noted from Figure 3 that the threaded bores 9a and 10a and the corresponding clamping screws are in off-set relation to each other. The purpose of this structure is to provide for different sized members which are to be locked into position in the clamp. This same feature is also preferably employed in conjunction with the clamp shown in Figure 1.

Figure 3 shows members of two different sizes which are clamped into position. The member 20 shown in dotted lines is held firmly in the clamp by means of the clamping screws shown in dotted lines whereas the smaller member 12a is held in the clamp by means of the lower clamping screw 11a.

The overhanging lip 26 provides a highly desirable feature of my invention in that it enables one to obtain additional friction depending on the size of the member clamped therein, and it also prevents members loosely held between the jaws from falling out. In other words, it serves to provide both additional clamping surface and it also acts as a safety device. The bosses 7 and 8 serve to provide strength and afford a greater threading area which enables members to be clamped into place without danger of shearing the threads. The clamp is preferably made of steel or other desirable metal and should possess a degree of resilience although, to all outward appearances, it might appear to be rigid.

What I claim as new and desire to protect by Letters Patent of the United States is:

1. A clamp comprising a pair of clamping members of like construction disposed back to back and held together by means of a connecting member, each of said clamping members comprising a pair of spaced jaws connected by a wall, the jaws being at substantially right angles to said wall and forming a substantially rectangular space therewith, one of said jaws being provided with an overhanging lip, and each of said jaws being provided with a threaded bore and being adapted to receive a threaded clamping screw.

2. The structure defined in claim 1 wherein the clamping members are rigidly fixed to each other whereby elements clamped in the jaws of said members will be at substantially right angles to each other.

3. The structure defined in claim 1 wherein the exterior surfaces of the jaws are provided with bosses through which the threaded bores pass.

4. The structure defined in claim 1 wherein the threaded bores in each clamping member are disposed in different planes.

5. The structure defined in claim 1 wherein the clamping members are swiveled upon each other whereby said clamping members may be disposed at any desired angle to each other.

6. The structure defined in claim 1 wherein the connecting walls of the clamping members are provided with interfitting male and female members to minimize shear upon the connecting members.

7. A clamp comprising two clamping members of like construction, each of said clamping members comprising a pair of substantially parallel spaced jaws spanned by a wall at right angles thereto and forming a substantially rectangular space therewith, one of said jaws being provided with an overhanging lip, said clamping members being disposed in contiguous relation to each other along the spanning walls thereof and held together by a connecting element, and each of said jaws being provided with a threaded bore and being adapted to receive a threaded clamping screw.

8. A clamp comprising two clamping members of like construction, each of said clamping members comprising a pair of substantially parallel spaced jaws spanned by a wall at right angles thereto and forming a substantially rectangular space therewith, one of said jaws being provided with an overhanging lip, said clamping members being disposed in contiguous relation to each other along the spanning walls thereof and held together by a connecting element, and each of said jaws being provided with a threaded bore and being adapted to receive a threaded clamping screw, and wherein the clamping members are swiveled upon each other whereby said clamping members may be disposed at any desired angle to each other.

9. A clamp comprising two clamping members of like construction, each of said clamping members comprising a pair of substantially parallel spaced jaws spanned by a wall at right angles thereto and forming a substantially rectangular space therewith, one of said jaws being provided with an overhanging lip, said clamping members being disposed in contiguous relation to each other along the spanning walls thereof and held together by a connecting element, and each of said jaws being provided with a threaded bore and being adapted to receive a threaded clamping screw, and wherein the clamping members are swiveled upon each other whereby said clamping members may be disposed at any desired angle to each other, and wherein the connecting element is a bolt which is countersunk in at least one of the spanning walls of the clamping members whereby the top surface of said bolt is substantially flush with the interior surface of the spanning walls.

10. A clamp comprising a pair of clamping members of like construction connected together and disposed in contiguous relation to each other along a wall of each clamping member, each of said clamping members comprising a pair of spaced jaws which, together with said wall, define a substantially rectangular socket, and a jaw of each of said clamping members being provided with an overhanging lip, the jaws being provided with threaded bores which are adapted to receive a threaded clamping element.

11. A clamp comprising a pair of clamping members of like construction connected together and disposed in contiguous relation to each other along a wall of each clamping member, each of said clamping members comprising a pair of spaced jaws which, together with said wall, define a substantially rectangular socket, a jaw of each of said clamping members being provided with an overhanging lip, the jaws being provided with threaded bores which are adapted to receive a threaded clamping element, and wherein the clamping members are swiveled upon each other whereby said clamping members may be disposed at any desired angle to each other.

12. A clamp comprising a pair of clamping members of like construction connected together and disposed in contiguous relation to each other along a wall of each clamping member, each of said clamping members comprising a pair of spaced jaws which, together with said wall, define a substantially rectangular socket, a jaw of each of said clamping members being provided with an overhanging lip, the jaws being provided with threaded bores which are adapted to receive a threaded clamping element, wherein the clamping members are swiveled upon each other whereby said clamping members may be disposed at any desired angle to each other, and wherein the exterior surfaces of the jaws are provided with bosses through which the threaded bores pass.

13. A clamp comprising a member embodying a pair of spaced essentially parallel clamping surfaces spanned by a wall portion which is integral therewith and at substantially right angles thereto and forming a substantially rectangular space therewith, one of said clamping surfaces being provided with an overhanging lip, the exterior faces of said clamping surfaces being provided with bosses and having threaded apertures therein which pass through both the bosses and the clamping surfaces adjacent thereto, and a member of like construction to that previously described and connected thereto along the spanning wall, the spanning walls of said members being contiguous with each other.

14. A clamp comprising a member embodying a pair of spaced essentially parallel clamping surfaces spanned by a wall portion which is integral therewith and at substantially right angles thereto and forming a substantially rectangular space therewith, one of said clamping surfaces being provided with an overhanging lip, the exterior faces of said clamping surfaces being provided with bosses and having threaded apertures therein which pass through both the bosses and the clamping surfaces adjacent thereto, and a member of like construction to that previously described and connected thereto along the spanning wall, the spanning walls of said members being contiguous with each other, and wherein the clamping members are swiveled upon each other whereby said clamping members may be disposed at any desired angle to each other.

15. A clamp comprising a pair of clamping members of like construction disposed back to back and held together by means of a connecting member, each of said clamping members comprising a pair of spaced jaws connected by a wall and forming a substantially rectangular space therewith, the jaws being at substantially right angles to said wall, one of said jaws being provided with an overhanging lip, and each of said jaws being provided with a threaded bore and being adapted to receive a threaded clamping screw, wherein the clamping members are rigidly fixed to each other whereby elements clamped in the jaws of said members will be at substantially right angles to each other, and wherein the exterior surfaces of the jaws are provided with bosses through which the threaded bores pass.

16. A clamp comprising a pair of clamping members of like construction disposed back to back and held together by means of a connecting member, each of said clamping members comprising a pair of spaced jaws connected by a wall and forming a substantially rectangular space therewith, the jaws being at substantially right angles to said wall, one of said jaws being provided with an overhanging lip, and each of said jaws being provided with a threaded bore and being adapted to receive a threaded clamping screw, one of said jaws being provided with auxiliary threaded apertures disposed in a plane closer to the connecting wall than the plane of the threaded bore and being adapted to receive threaded clamping screws whereby relatively small elements may be firmly held within the clamp.

FELIX JOSEPH LEMIEUX.